United States Patent [19]

Brinkman

[11] Patent Number: 4,512,023

[45] Date of Patent: Apr. 16, 1985

[54] ELECTRODES FOR GLASS FURNACES

[75] Inventor: Richard J. Brinkman, Pattingham, Nr. Wolverhampton, England

[73] Assignee: Dyson Refractories Limited, England

[21] Appl. No.: 503,418

[22] Filed: Jun. 10, 1983

[30] Foreign Application Priority Data

Jun. 15, 1982 [GB] United Kingdom ................ 8217284

[51] Int. Cl.[3] ............................................ C03B 5/027

[52] U.S. Cl. .................................................... 373/36

[58] Field of Search ..................... 373/36, 37, 38, 114, 373/120, 132, 133, 125, 126

[56] References Cited

U.S. PATENT DOCUMENTS

| | | | |
|---|---|---|---|
| 3,391,237 | 7/1968 | Penberthy . | |
| 3,681,506 | 8/1972 | Can | 13/6 |
| 3,813,468 | 5/1974 | Shaw | 373/36 |
| 4,004,844 | 1/1977 | Knapton et al. | 373/36 |
| 4,110,545 | 8/1978 | Shaw et al. | 373/36 |

FOREIGN PATENT DOCUMENTS

| | | | |
|---|---|---|---|
| 1381194 | 1/1975 | United Kingdom . | |
| 1514590 | 6/1978 | United Kingdom . | |
| 325727 | 1/1972 | U.S.S.R. | 373/38 |
| 617387 | 7/1978 | U.S.S.R. | 373/38 |

*Primary Examiner*—Reinhard J. Eisenzopf
*Assistant Examiner*—Gregory D. Thompson
*Attorney, Agent, or Firm*—King, Liles and Schickli

[57] ABSTRACT

The invention relates to electrodes, particularly for glass furnaces and is concerned with means for forming good electrical contact between the electrode body and a source of electrical supply, which avoid the problems with known electrodes. The objective of the invention is met by an electrode comprising an elongate ceramic electrode body, connecting the electrode body to a source of electrical supply, characterized by a transverse hole (2) extending through the body (1) towards one end thereof, a slot (3) extending from the transverse hole and emerging at the said one end of the body, a plug member (5) having a cross-sectional shape corresponding to the shape of the transverse hole (2) and being a close fit therein, and being of the same material as that of the electrode or of a chemically compatible material having closely related expansion characteristics as that of the electrode material, and a wrapping of a sheet (4) of noble metal around the plug member (5), the end (4A, 4B) of the sheet (4) extending through the slot (3) to a clamp at that end of the electrode to connect the sheet to a source of electrical supply.

8 Claims, 3 Drawing Figures

ELECTRODES FOR GLASS FURNACES

Figure 1:
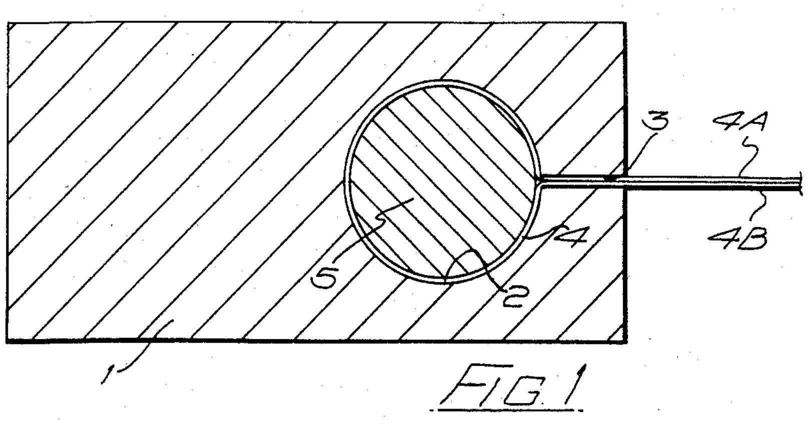

This invention relates to electrodes for glass furnaces, and is particularly concerned with electrodes with ceramic bodies, more particularly tin oxide and the provision of efficient electrical connection to the electrode.

Electrodes with tin oxide bodies are used for introducing the electric power into glass, particularly lead glass, during electric melting. The electrodes may be used in the main part of a tank furnace or in other parts of the furnace, e.g., throat, riser or forehearth. They can be used where electricity is the sole source of power or as boosters in furnaces fired by other sources of energy. Tin oxide appears to be the most suitable electrode body material for melting lead glasses, since, unlike materials such as molybdenum and graphite, it does not reduce the lead oxide to metallic lead. Furthermore, it does not colour the glass significantly.

Tin oxide as normally produced commercially, contains small quantities of additives to promote electrical conduction and sinterability. However, although the electrical conductivity is high at glass melting temperatures it is generally much lower at lower temperatures. Experiments have shown that, for tin oxide large currents can only be conducted efficiently above about 700° C. A difficulty arises, therefore in making an electrical connection to an electrode passing through a furnace wall where, although one end is immersed in molten glass at relatively high temperatures, the other end is relatively cool. Passage of high currents through low temperature regions of tin oxide causes self heating of the electrode which can cause cracking under certain circumstances. Further, the dissipation of power by self-heating is inefficient and can lead to other problems such as glass leaking back through the annulus between the electrode and the furnace wall.

In an attempt to overcome the above disadvantages, a number of ways of effecting electrical connection to tin oxide electrodes have been attempted. Thus, it is known for the electrode to be externally silvered along its length by the application of a silver suspension followed by firing to form a coherent layer, with the provision of an external clamp secured to the cooler end of the silvered electrode to provide the connection to a supply of electricity. The current is then conducted via the silver layer to by-pass the low temperature, low conductivity zone of the electrode. By the point along the length of the electrode at which the silver has melted (at an approximate temperature of 960° C.) tin oxide is sufficiently conductive to carry the electrical load itself. However, such silver layers are extremely thin, e.g., of the order of 0.025 mm, and are particularly vulnerable to attack from corrosive atmospheres and molten glass and to mechanical damage, any of which can destroy the continuity of the silver layer. To avoid the problems of silver layers, U.S. Pat. No. 3,391,237 proposes that silver rods should be inserted into holes extending from the cold end of the electrode to beyond the point where the temperature of the electrode in service will be such as to melt the silver rod, the molten silver providing the required electrical contact with the electrode. However, this requires that the electrode be at a sufficient (a substantial) angle to the horizontal such that when the hot end of the silver rod melts molten silver can run back through the gap between the silver rod and the hole in the electrode until it reaches a point where the temperature of the electrode is not sufficient to maintain the silver molten. At that point, it freezes to provide the electrical contact between the silver rod and the electrode. The disadvantages of such construction are that the contact area between the silver and the electrode is necessarily small causing a heavy concentration of current at that point, and which is undesirable, and that the molten silver can penetrate the tin oxide.

It is also known (see for example British Patent Specification No. 1,381,194) to employ an expandable connector, which, after insertion into a hole in the electrode can be expanded such that the connector and the electrode are brought into intimate contact. Whilst this does provide an efficient means of providing electrical contact over a relatively large area, it is not possible because of the prohibitive cost to make such expandable connector from a noble metal such as silver. Even when the connector is made of a relatively deformable material such as copper, and even when slotted to allow for thermal expansion there is a distinct tendency to rupture the electrode by virtue of the differential thermal expansion effect during use.

A further known form of connection (see U.S. Pat. No. 3,681,506) is one which fits flush with the whole of the back face of the electrode in an attempt to permit uniform current and voltage distribution within the electrode. However, this results in the generation of heat as the current passes through the low conductivity zone of the tin oxide electrode which is wasteful of electricity, and can lead to problems such as glass leakage back between the electrode and the access hole in the furnace wall.

It is also known from British Pat. No. 1,514,590 to provide an electrode with a body having at least one longitudinal hole, an elongated hollow connector member of a noble metal having a cross-sectional shape corresponding to that of the hole and being a close fit in the hole, and a plug member having a cross-sectional shape corresponding to that of the connector member and being a close fit within the connector member, the plug member being formed from a material having the same thermal expansion characteristics as the material of the electrode body. Whilst this construction constitutes a significant advance over constructions known hitherto, it is still possible to improve the distribution of electrical supply to the electrode body.

The object of the invention is to provide an improved electrical connection for, particularly, a tin oxide electrode.

According to the present invention, an electrode comprises an elongate ceramic electrode body, a transverse hole extending through the body towards one end thereof, a slot extending from the transverse hole and emerging at the said one end of the body, a plug member having a cross-sectional shape corresponding to the shape of the transverse hole and being a close fit therein, and being of the same material as that of the electrode, or of a chemically compatible material having closely related expansion characteristics as that of the electrode material, and a wrapping of a sheet of noble metal around the plug member, the end of the sheet extending through the slot to clamping means at that end of the electrode to connect the sheet to a source of electrical supply. Preferably, the material of the electrode body and the plug is tin oxide, and the noble metal is preferably silver.

By providing an electrical connection across the full width of the electrode body, the temperature of the contact surface is substantially uniform with the effect that substantially the whole of the contact area is employed for the passage of current into and through the electrode body, resulting in a more efficient electrical connection than is the case where a connector is disposed longitudinally of the electrode body where there is the tendency for the concentration of current at the tip of the connector. In addition, because the invention embodies an internal connection, it operates at a higher temperature with a consequent lower Joule heating effect which is generated by the passage of current through a relatively cool (and hence resistive) part of the electrode, and is therefore advantageous over the known backface connector referred to previously.

Advantageously, the sheet of noble metal may extend out of the slot and simply be secured directly to, e.g., the end of an aluminium braid, the braid itself being connected to a source of electrical supply. However, it is possible, if required, to form the electrode body with a clamping means. Thus, one end of the body can be formed with a recess into which the slot in the electrode body emerges, and in the recess a first conductive metal plate provided to trap the silver sheet to one face of the recess, with a second conductive metal plate to trap against the first plate an electrically conductive material, there being means to secure the plates in place and to connect the second plate to a source of electrical supply. Alternatively, one metal plate may be located in the bottom of the recess, and the silver sheet and the conductive material trapped together between that plate and a second metal plate. Preferably the two plates are of steel, and the electrically conductive material between the plates is aluminium braid. The means securing the plates may simply be a bolt passing through an appropriately disposed hole in the electrode body, on to which is fitted a connector member urged into intimate contact with the second plate on tightening the nut associated with the bolt. The electrode body is preferably recessed so that the bolt head lies flush with the surface of the body.

Figure 2:
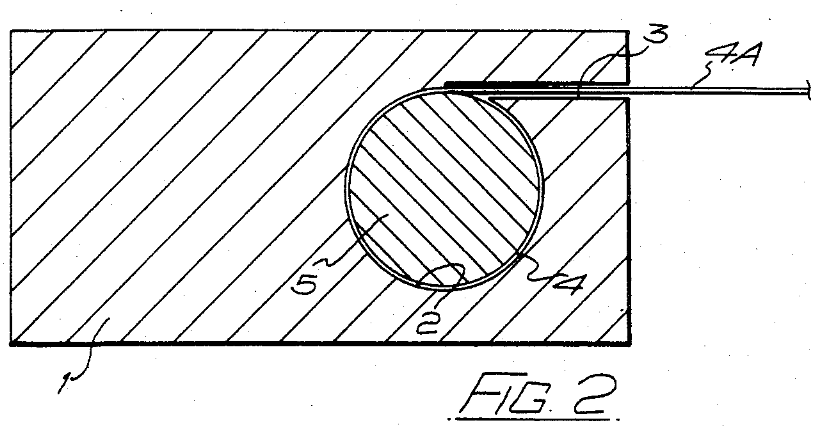

Three embodiments of the invention will now be described with reference to the accompanying drawings, in which:

FIG. 1 is a sectional side elevation through one embodiment of an electrode in accordance with the invention;

FIG. 2 corresponds to FIG. 1, but shows a second embodiment of electrode; and

Figure 3:
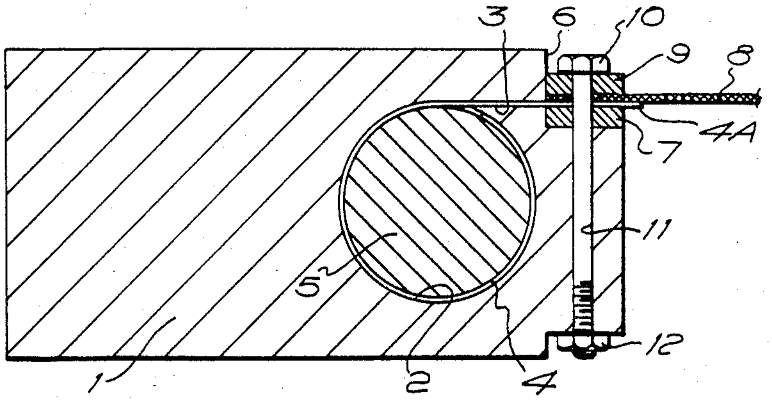

FIG. 3 corresponds to FIG. 1, but shows a third embodiment of electrode.

In FIG. 1, an electrode is formed by an electrode body 1 of tin oxide. Towards one end of the body 1 a transverse hole 2 is provided, extending across the full width of the body, the hole 2 being intersected by a transverse slot 3, also extending across the full width of the body 1, the slot 3 being generally in-line with the axis of the hole 2, and emerging in the end face of the body 1. The inner surface of the hole 2 is lined with a sheet 4 of a noble metal, e.g., silver or platinim, with the ends 4A and 4B of the sheet passing through the slot 3 to emerge from that end of the body 1 whereby the ends of the sheet can be attached to a connector (not shown) to attach the sheet to a source of electrical supply. Inserted in the hole 2 is a tightly fitting plug 5 also of tin oxide, or of a material that in the relevant temperature range, i.e., up to at lest 900° C., is chemically compatible and has closely matching expansion characteristics to tin oxide, the plug 5 ensuring firm contact over the whole surface area between the inner surface of the hole 2 and the sheet 4. To further ensure good contact between the sheet 4 and the inner surface of the hole 2, it is, prior to the placement of the sheet, lined with a suspension of silver of platinum, and after the insertion of the plug 5, the assembly is heated to a temperature of approximately 600° C. to form a bond between the layer and the sheet.

In FIG. 2 (where like reference numerals are applied to the corresponding parts) the transverse slot 3 is positioned at a tangent to the hole 2, and the sheet of silver or platinum has one end 4A only emerging from the slot for connection to a source of electrical supply.

In the embodiment of FIG. 3 (where again like reference numerals are applied to corresponding parts) there is shown a possible way of connecting the end 4A of the sheet 4 to a source of electrical supply, where the electrode body 1 is formed with its own connector. Thus, the transverse slot 3 is again positioned at a tangent to the hole 2, and the electrode body 1 formed with a recess 6 into which the slot emerges. A conductive metal (e.g., steel) plate 7 is placed in the bottom of the recess 6, and is overlaid by the emerging end 4A of the sheet 4. The end 4A of the sheet is then overlaid by an electrically conductive material 8 such as an aluminium braid of a width equal to the width of the sheet end 4A, and the aluminium braid itself overlaid by a second conductive metal (e.g., steel) sheet 9. The two metal plates 7, 9, and the intervening sheet end 4A and aluminium braid 8 are provided with cooperating through holes for the passage of a bolt 10, extending through a co-operating through hole 11 in the electrode body 1, to a nut 12, the electrode body to that side preferably having a recess 13 to prevent the nut 12 from protruding beyond the side face of the body. Thus, on tightening the nut 12, the sandwich of metal plates, braid and sheet forms a most effective electrical connection between the braid and the sheet, the braid 8 extending beyond the sheet end 4A for connection to a source of electrical supply.

I claim:

1. An electrode comprising an elongate ceramic electrode body, a transverse hole extending through the body towards one end thereof, a slot extending from the transverse hole and emerging at the said one end of the body, a plug member having a cross-sectional shape corresponding to the shape of the transverse hole and being a close fit therein, said plug member being formed from a chemically compatible material having expansion characteristics closely related to those of the electrode material and a wrapping of a sheet of noble metal around the plug member, the end of the sheet extending through the slot to clamping means at that end of the electrode to connect the sheet to a source of electrical supply.

2. An electrode as in claim 1, wherein the material of the electrode body and the plug is tin oxide.

3. An electrode as in claim 1, wherein the noble metal is silver.

4. An electrode as in claim 1, wherein the sheet of noble metal extends out of the slot for direct connection to an electrically conductive material.

5. An electrode as in claim 1, wherein one end of the electrode body is formed with a clamping means, there being at one end of the body a recess into which the slot emerges, and there being in the recess two metal plates to clamp the emerging end of the metal sheet and an electrically conducting material, to each other in the recess by bolt means.

6. An electrode as in claim 1, wherein the electrode and plug are of the same material.

7. An electrode as in claim 4, wherein said electrically conductive material is aluminum braid.

8. An electrode as in claim 5, wherein said electrically conducting material is aluminum braid.

* * * * *